(12) United States Patent
Librici

(10) Patent No.: US 12,381,457 B2
(45) Date of Patent: *Aug. 5, 2025

(54) METHOD AND DEVICE FOR FORMING METAL ARMATURES OF ELECTRIC MOTORS OR SIMILAR CONSISTING OF PACKS OF SHEETS WITH SUBGROUPS OF SOLIDARIZED SHEETS

(71) Applicant: DEMA S.R.L., Varazze (SV) (IT)

(72) Inventor: Cesare Librici, Savona (IT)

( * ) Notice: Subject to any disclaimer, the term of this patent is extended or adjusted under 35 U.S.C. 154(b) by 517 days.

This patent is subject to a terminal disclaimer.

(21) Appl. No.: 17/671,680

(22) Filed: Feb. 15, 2022

(65) Prior Publication Data

US 2022/0263391 A1 Aug. 18, 2022

(30) Foreign Application Priority Data

Feb. 16, 2021 (IT) .................. 102021000003434

(51) Int. Cl.
*H02K 15/02* (2025.01)
*B23K 37/04* (2006.01)
*F16B 5/08* (2006.01)

(52) U.S. Cl.
CPC ......... *H02K 15/02* (2013.01); *B23K 37/0408* (2013.01); *F16B 5/08* (2013.01)

(58) Field of Classification Search
CPC H02K 15/02; B32B 39/00; B32B 2037/1253; F16B 5/08
See application file for complete search history.

(56) References Cited

U.S. PATENT DOCUMENTS

| 2017/0012508 A1* | 1/2017 | Senn | H02K 15/02 |
| 2020/0161946 A1* | 5/2020 | Kimura | H02K 15/12 |

FOREIGN PATENT DOCUMENTS

| DE | 102018122047 | 3/2020 | |
| JP | 2019033595 | 2/2019 | |
| WO | WO-2020021472 A1 * | 1/2020 | ........... B65G 59/062 |

OTHER PUBLICATIONS

Italian Patent and Trademark Office, Search Report, Nov. 5, 2021—(Relevant portions are in English).

* cited by examiner

*Primary Examiner* — Carson Gross
(74) *Attorney, Agent, or Firm* — Themis Law

(57) ABSTRACT

A method and a plant for making packs of metal sheets forming rotors or stators of electric machines or the like by stacking a predetermined number of metallic sheets and stably connecting those sheets along at least two weld beads in opposing or different angular positions, include providing at least one subgroup of the metallic sheets defining the pack of sheets, and disposing, at least at one region of reciprocal contact of the surfaces of the sheets, one or more adhesive substances that solidarize the sheets of the subgroup. The one or more adhesive substances can be activated by chemical-physical action, and the solidarization of the subgroups of sheets is carried out before stacking with the remaining sheets of the pack, or in one or more steps subsequent to the stacking, simultaneously or separately to the application of the weld beads.

19 Claims, 2 Drawing Sheets

METHOD AND DEVICE FOR FORMING METAL ARMATURES OF ELECTRIC MOTORS OR SIMILAR CONSISTING OF PACKS OF SHEETS WITH SUBGROUPS OF SOLIDARIZED SHEETS

FIELD OF THE INVENTION

The present invention relates to a method and a plant for implementing such a method applied to the formation of electrical armatures used, for example, as rotors or stators body for electrical machines, turbines or the like. A common way of realizing such an armature is by superimposing a number of metallic sheets having magnetic properties that, when assembled, form a (rotoric or statoric) pack of sheets sometimes known as a laminations pack.

A laminations pack realized in this way has important advantages compared to other constructive solutions, such as the obvious reduction of eddy currents and therefore a greater electrical and thermal efficiency.

BACKGROUND OF THE INVENTION

It is known to automate partially or completely the formation of laminations packs in plants dedicated to this purpose, which assemble a plurality of sheets taken from an input magazine by overlapping and connecting them to each other with a thermal and/or mechanical process such as by realizing one or more welds in order to join the sheets of the pack or by clamping with third elements or even by interlocking of the sheets by through pins or tongues arranged transversally to several sheets and cooperating with slots previously obtained in the sheets themselves.

At the state of the art are known different methods and plants designed for the realization of laminations packs obtained by assembling and successively connecting a plurality of preformed sheets, which sheets are taken from one or more magazines according to specific devices intended to optimize the speed and efficiency of execution.

One of these methods is described in WO2020/021472, wherein a method is described for automatically forming packs of metal sheets, for forming armatures of electrical machines, or the like, by an automatic precision batching of a pack of sheets consisting in picking up and separating a predetermined number of sheets, corresponding to a predetermined height of said pack, from a stack of sheets having a greater height than said pack and comprising the following steps:
  grasping at one end of the stack of sheets a predetermined number of sheets corresponding to the height of the pack of sheets,
  separating of said number of sheets of the pack from said stack of sheets by relative axial distancing of the pack from the stack of sheets by a predetermined distance,
  performing a separation action of one or more the sheets at the end of said pack of sheets facing the stack of sheets, which possible last sheet or which possible last sheets have been erroneously adhered to a sheet of the pack of sheets intended to be the last sheet of said pack, being the one or more possible last sheets precariously tightened for a part of their thickness or moderately adhering to the lower sheet of the pack of sheets while they are instead intended to constitute the first sheet of the stack of sheets facing the separated pack of sheets,
  collecting said or said eventual detached sheets on the end of the stack of sheets facing the pack in a position axially aligned with the sheets of said stack.

This document further provides that the sheets forming the pack or packs required to make the armature are then solidarized together into a block by means of a thermal/mechanical connection in order to join the single sheets of the pack, for example by means of a plurality of weld beads or weld lines oriented in the axial direction of the sheet pack or packs and provided at two or more angular positions of the outer and/or inner mantle surface of the sheet pack or packs provided for the armature.

This connection method through welding is commonly used in the assembling of armatures as it is easy to realize, economical and extremely long-lasting and high-performing in the task of keeping together the sheets constituting the pack. It is preferably carried out using several weld beads executed in a transverse direction and preferably parallel to the assembling axis of the pack, arranging several weld beads in different angular positions of the side surfaces of the pack of sheets.

A limitation of this technique is that the weld beads, if positioned in particular areas of the pack, can affect the magnetic performance of the armature obtained in this way. In particular, it is preferable to avoid welding in correspondence with or in proximity to the laminations that provide the polar expansions, since this would introduce a degradation factor of the electromagnetic field that cannot be tolerated in high-performance electric motors.

In a stator armature, for instance, it would be impossible to perform welds on the inner mantle surface, thus limiting the useful areas for joining to the outer mantle surface.

Consequently, some portions of a sheet remain distant from the welding beads and therefore only weakly constrained to the corresponding areas of the preceding and following sheets; downstream of the stacking, the compression and the welding process, therefore, it is possible to find deviations of some areas of the sheets from the geometric plane in which they originally lay and this phenomenon is more evident for the elements present at the ends of the pack. Usually, this results in a variation of coplanarity between the upper and lower sheets. That is, the distance between two corresponding free (non-welded) regions of the lower and upper sheets is different than two corresponding connected (welded) regions of the same sheets.

This lack of coplanarity, which is more or less pronounced according to the variation of the overall dimensions of the armature and/or of the mechanical characteristics of the single layer composing the pack, leads to problems of production quality in the subsequent stages of the implementation process of the electric motor, such as, for example, in the realization of the insulation in the slot and of the windings or the encapsulation of the armature in special casings.

SUMMARY OF THE INVENTION

The object of the invention is therefore to realize assembled laminations packs by improving the coplanarity of the sheets constituting the pack and to compensate deviations in a substantially axial direction of the ends of the sheets spaced from the welding regions.

The invention overcomes these and other limitations through a method for making packs of metal sheets forming rotors or stators of electric machines or the like, by stacking a predetermined number of metallic sheets and connecting them in a stable way along at least two weld beads opposing one another or disposed at different angular positions, providing for at least a subgroup of said sheets constituting the pack of sheets, at least at one region of the reciprocal contact surfaces of the sheets, substances of mutual adhesion for the solidarization of the sheets of the subgroup, which substances can be activated by chemical-physical action, and which subgroups of the sheets are reciprocally solidarized:

before the stacking with the remaining sheets of the pack or in one or more stages subsequent to the stacking in the pack of sheets, simultaneously or separately to the application of said weld beads, the solidarizing substances being applied simultaneously with the forming of at least a subgroup to one or more sheets or being applied previously to one or more sheets.

Thus, the method object of the invention contemplates the use of one or more adhesion substances applied to a subgroup of the sheets of the pack constituting the rotor or stator armature of an electrical machine or the like. The application of the adhesion substances is provided to solidarize a known number of sheets intended to constitute the pack of sheets, and preferably this number is chosen to be less than the total number of sheets in the pack.

In an embodiment further described below, it is provided that the final pack of sheets is composed of a plurality of sheets selected and stacked individually or in blocks in a quantity less than the quantity necessary to constitute the armature, and it is further provided that this plurality of sheets is comprised between two presolidarized blocks of sheets arranged at the axial ends of the armature as assembled.

In this embodiment, the plurality of sheets thus constitutes a central subgroup which does not necessarily have to be provided with adhesive between one sheet and the other since it remains compressed between the two presolidarized blocks and joined to them by one or more welding beads as traditionally known.

Such a solidarized pack of sheets is herein referred to as a subgroup in the sense that among other things, the sheets of said subgroup are a subset of the total number of sheets intended to constitute the armature of the electric motor or the like.

Here it is understood that the pack of sheets is made by superimposing a known number of flat sheets having the same geometric shape and that such sheets are stacked along an assembling axis orthogonal to the plane of each sheet.

It is provided that several subgroups of sheets are realized within the same pack, as also foreseen in one or more embodiments described below.

The action of the solidarizing substance, hereafter also referred to as the solidarizing agent, is preferably applied in the regions of the sheets that most distant from the mechanical joining regions (welding, crimping or other) of the pack. In the exemplary and non-limiting case of a stator with weld beads, wherein the welds are applied to the outer mantle surface, the adhesion substance is preferably disposed in one or more regions of the sheet tongues forming the polar expansions.

This overcomes the technical problem described above, resulting from the impossibility of realizing welding beads in particular regions of the sheets, such as, for example, those in correspondence with or near the polar expansions of a stator, by using adhesive agents that make it possible to mutually constrain even the zones most distant from the welding beads.

In this and other executive forms described herein, reference may be made to welding processes for the transversal joining of all or part of the sheets; however, the person skilled in the art and not only him will easily be able to apply the same inventive concept to alternative mechanisms other than welding, such as, for example, crimping or clamping by means of a clamp.

The solidarization, understood as the action resulting in the formation of a block of sheets mutually linked by means of adhesion substances, may occur simultaneously or separately to the generic assembling steps of the pack, depending on the best technical configuration that is proportionate to the economic aspects involved in the implementation of the method object of the invention.

In an embodiment, the number of sheets constituting at least one of the subgroups is calculated according to the following steps:

defining a target quantity of sheets of predetermined thickness required to form said pack of sheets;

defining the target axial length of the pack of sheets;

stacking a certain number of sheets in a number less than the target quantity of sheets;

determining the cumulative axial thickness of the pack of sheets after stacking said sheets;

determining the axial thickness missing from the target axial thickness by subtracting from the latter the cumulative axial thickness;

calculating the number of sheets constituting one of the subgroups as a function of the missing axial thickness and of the thickness of the individual sheet;

realizing a solidarized subgroup of sheets (SG2) by solidarization of single sheets in quantities equal to the number calculated in the previous step;

stacking to the already stacked sheets the solidarized sub-group realized in the previous point.

This method introduces the additional step of obtaining the correct axial thickness of the armature in addition to the benefit of obtaining the coplanarity of the two faces at the end of the armature. The method is useful in all cases where there may be an error in the number of single sheets being used to form the pack, due to possible pick-up errors from the magazine in which they are stored before being subjected to assembling operations. It is in fact common to stack more sheets than necessary due to the adhesion effects that hold one sheet to the other when they are picked up, resulting in the disadvantageous effect of picking up a larger number of objects than necessary and thus generating an armature whose axial dimension is greater than the target dimension.

However, it is also possible to select a smaller number of sheets, resulting in an armature whose axial dimension is smaller than the target dimension.

Thanks to the aforementioned, the method comprises a series of steps in which a subset of sheets is grouped together to which a pre-solidarized block is superimposed, composed of a number of objects which is calculated in the same step of assembling, allowing the correction of any errors occurred during the construction of the first part of the armature and thus allowing advantageously the desired axial thickness of the complete stack to be reached.

In one embodiment, the subgroups of sheets are selected, assembled and solidarized separately from the pack, steps being provided for picking up, assembling and solidarizing a known quantity of sheets in an amount constituting the single subgroup and subsequent steps being provided for stacking one or more solidarized subgroups with a plurality of single sheets in the quantity that is necessary to form the pack of sheets.

According to this variant, one or more subgroups of solidarized sheets are previously produced, which subgroups are successively assembled with other single sheets chosen in such a quantity as to reach the final and predefined number of elements that according to the project realize the body to be produced.

Advantageously, this embodiment of the method involves the production of one or more solidarized subgroups of sheets in advance of the production of the pack. This production may take place in a dedicated production area, which may not coincide with the manufacturing site of the pack and/or may be shared between several final sites for the assembling of the pack.

For example, it is possible to provide specialized production sites or production areas of a site that are specialized in the production of solidarized subgroups which are stored and/or distributed for a later incorporation step of the pack.

In a preferred variant of the method, said subgroups of sheets are provided at one or both opposite ends of the pack of sheets.

According to this last variant, the method for forming armatures from packs of sheets described above includes an embodiment comprising the following steps:
defining a number of sheets required to form a pack of mutually stacked sheets having a predetermined axial dimension, i.e., in the direction of stacking;
the number of sheets being calculated on the basis of the thickness of the sheets and the desired or target axial dimension of the pack of sheets;
defining a first subgroup of sheets comprising a predetermined number of sheets less than the total number of sheets calculated in the previous step;
solidarizing the sheets of said subgroup according to one or more of the variants previously described for the previous solidarization of the sheets of a subgroup of sheets;
adding to the subgroup of sheets a predetermined number of sheets in such a quantity as to generate a partial pack of sheets whose axial dimension is less by a predetermined amount than the desired axial dimension of the complete pack of sheets;
verifying by measurement at the end of said step and/or at regular intervals the axial dimension of said partial pack of sheets;
comparing said measured value with the preset value of the axial dimension of said partial pack of sheets;
calculating on the basis of the difference of the aforementioned measured and preset values of the axial dimension of the partial pack of sheets, the number of sheets required to form at least one further subgroup of sheets required to generate a complete pack of sheets with the preset or desired axial dimensions, and
selecting said number of sheets for said subgroup of sheets, solidarizing the sheets of said subgroup according to one or more of the alternatives described above for the previous solidarization of the sheets of the subgroups;
adding the subgroup to the partial group of sheets as an end subgroup to complete the full pack of sheets;
solidarizing together all the sheet metal of the at least two subgroups of presolidarized sheets at the initial and final ends of the pack of sheets and of the part of the pack of sheets interposed between said at least two presolidarized end subgroups.

According to an embodiment of the method of the present invention, which may be provided in combination with any of the preceding embodiments, the method provides that the selection and picking of the number of sheets for at least one of the subgroups of presolidarized sheets takes place by magnetic attraction of individual sheets and deposition thereof by repulsion or by suction pick-up by means of a vacuum head and releasing by cessation of the vacuum, while the sheets of at least one further subgroup of sheets, which are optionally not presolidarized with each other, is carried out by mechanical selection and pick-up.

In the present description and the subsequent claims, there is described and claimed a preferred method of mechanically selecting and picking up sheets which can be provided as a preferred solution for implementing the above-mentioned step of mechanically selecting and picking up sheets.

According to an embodiment, the sheets of the two subgroups of presolidarized sheets provided at the head ends of the pack of sheets are selected and picked up magnetically or by suction, while the sheets that are provided in the part of the pack interposed between said two end subgroups are selected and picked up by mechanical selecting and picking.

As already mentioned above, the pack of sheets is made by superimposing a known number of flat sheets having the same geometric shape and such sheets are stacked along an assembling axis orthogonal to the plane of each sheet; consequently, it is possible to identify two ends of the pack of sheets, as well as a first and a last sheet or a lower sheet and an upper sheet, which are characterized by having the greatest mutual distance between all of the elements constituting the pack.

From the description of the technical problem that the invention intends to solve, the sheets placed at the ends are those which suffer from greater discrepancy of planarity, in addition to forming the lower and upper surfaces of the complete armature. Advantageously, the application of the method allows to obtain a structure in which the sheets at the ends are incorporated in a solidarized subgroup also in the regions distant from the welding beads, ensuring greater conformity of the structure and acting as a stabilization element also for the single sheets located between the two blocks at the ends of the pack, i.e. the lower block and the upper block of the stack that makes up the pack.

In a further embodiment, an in-line or serial process is provided, wherein the assembling of the pack of sheets is sequential to the realization of the subgroups of sheets or wherein the assembling of the pack of sheets takes place previously and separately from the forming of the pack of sheets. This variant finds a possible application within the plant itself, preferably provided with substations that process the sheets producing a sequence of complete packs of sheets.

This variant can be combined with one or more of the other embodiments and is contextualized in an extremely advantageous way in a sequence of steps, wherein inside an assembly station is initially positioned a first subgroup of sheets provided with a solidarizing agent, on which it is superimposed a known number of single sheets (possibly moved in blocks) and finally a second subgroup of sheets provided with a solidarizing agent.

A sub-variant of the invention provides that the solidarizing agent or adhesion substance is positioned on a part of the mutual contact surfaces of the sheets simultaneously with the stacking of said sheets in an assembly station and that the same station is subsequently able to arrange single sheets (not solidarized) in the same stack and within the same manufacturing process of the pack of sheets.

An alternative sub-variant to the previous provide instead that the subgroups of solidarized sheets are previously processed and then diverted to the assembly station as soon as said operation has been completed.

According to a further variant, said adhesion substances comprise a glue or adhesive localized on one or both surfaces of mutual contact of the single sheet. According to this variant of the method, which can be carried out in combination or sub-combination of other variants, it is foreseen the use of a fluid or solid adhesive, which is arranged, for example, by depositing it only on the top surface of a sheet, preferably during the stacking step, independently of the execution of this step before or during the assembling of the pack, or on both faces of the sheet. In this latter case it is possible to use bi-component products which make the solidarizing agent operative when the upper surface of a first sheet is in contact and/or pressing with the lower surface of a second sheet.

According to a further variant, the substances of mutual adhesion are pre-activated in their solidarizing action or can be activated when subjected to known specific environmental conditions.

This variant includes, for example, thermo-activatable or anaerobic products, which only exert their adhesive force in a specific activation step. This variant of the method can advantageously be combined with other variants concerning the preparation of the subgroup of sheets and is used as an non-limiting example in a process that provides for the ordered and centered positioning of all the sheets of the pack in a stack of an assembly station, after which the pressing and cross-welding process is performed. The pressing and/or welding operation may concurrently contribute to the activation of the anaerobic or bi-component adhesive and/or the thermo-activation of a thermo-activatable adhesive.

However, it is also possible that activation of adhesion substances is performed partially or totally before or after welding.

According to another alternative variant, at least part of the sheets constituting said one or more subgroups are pretreated with one or a combination of said mutual adhesion substances.

This variant includes, without limitations, the treatment of sheets with the coating of specific adhesive substances such as the technology commercially known as Backlack®.

In general, this alternative variant includes the case where at least part of the sheets joins the reinforcement construction process having already applied an adhesive for the subsequent solidarization of the subgroups. Advantageously, this embodiment is accompanied by the use of adhesive materials that are essentially inert when under normal environmental conditions and are activated when subjected to known conditions under which the adhesive exerts its bonding effect. Usually, the activation conditions are an increase of the temperature or the provision of energy in form of heat and the increase of pressure.

The invention refers also to a plant for the automated production of packs of sheets constituting rotors or stators of electric machines or the like by stacking and welding a predefined number of single metal sheets, comprising:
  at least one vertical magazine for at least one stack of sheets overlapping each other;
  a station for selecting and separating blocks of sheets in a known quantity from said stack of sheets;
  at least one assembly station for packs of sheets constituting an electric machine armature, or the like, in which at least two blocks of sheets are arranged axially aligned and coincident with each other, one on top of the other, said assembly station comprising:
  an assembly magazine for packs of sheets formed by at least one or more blocks of sheets, which magazine is provided with centering guides for said sheets;
  an axial presser of the sheets of the block or blocks of sheets unloaded into the store magazine;
  a tool for the stable connection of the packs of sheets present in the assembly magazine and in the condition pressed together, such as one or more welders that generate one or more welding beads in the axial direction of the packs of sheets in the store magazine, said one or more welders being supported movable along guides parallel to the axis of the packs of sheets and/or on radial guides with respect to said axis, alternatively at a working distance and at a rest distance;
  members for transferring the blocks of sheets from the selection and separation station to the assembly station in which at least two blocks of sheets are arranged one on the other, axially aligned and coincident with each other;
  an unloading station for said packs of sheets after the mutual stable connection of the sheets to each other;
  which plant operates in accordance with one or more steps of the described method and comprises a station for grouping of subgroups of sheets intended to form part of said pack of sheets, which grouping station comprises at least the following substations:
  a substation for selecting, separating and picking up a predefined number of sheets from at least one magazine;
  a stacking substation for sheets to form the subgroup composed of the sheets taken in the previous step;
  a transfer substation to said assembly station of one or more subgroups of sheets grouped together as in the previous step;
  being one or more of the sheets of said subgroup provided with at least one substance of mutual adhesion for the solidarization of the subgroup of sheets, which adhesive substance can be interposed between the sheets before or during the grouping process or already previously applied to at least part of the sheets.

According to a first variant of the plant object of the invention, said grouping station comprises a further substation for solidarizing said subgroup of sheets.

This variant thus provides for the presence in the plant of a station for the production of subgroups of sheets having adhesion substances in order to join the sheets in one or more solidarization regions, which adhesion substances are activated in their solidarizing action to form mutually solidarized subgroups of sheets. The adhesive substance can be interposed between one sheet and the other or the sheet may have already been treated or purchased directly from external manufacturers to thus contain the adhesive on at least part of the surfaces. The case of sheets marketed with treatment Backlack® falls into the latter type.

According to an alternative variant, the invention provides a plant, wherein said assembly station comprises a further substation for the solidarization of the subgroup of sheets, said solidarization being performed simultaneously or previously or after the application of said welding bead.

Differently from the previous case, the solidarization, that is the activation of the solidarizing agent applied to the sheets of the subgroup or subgroups of sheets, takes place in temporal proximity to the pressing and welding process. Advantageously, the same assembly and welding station operates by assembling and solidarizing the pack of sheets both with the physical action of welding and with the activation of the substances operating in the regions of the sheets lying far from the welding regions.

An alternative variant of the previous one provides that the solidarization, i.e. the activation of the adhesion substances, takes place in a second plant separate from the plant described herein. In this variant, the main plant is used to produce packs of sheets which are assembled, welded and provided with adhesive substances between some sheets of the pack, while the consolidation in the regions involved by the solidarization agent is performed in a second moment and, potentially, in a second device possibly foreseen for that purpose.

According to another variant, said grouping station comprises a further substation for the interposition of one or more adhesion substances between the elements of the stack which forms the subgroup of sheets.

According to another variant, a second grouping station of subgroups of sheets is provided, operating according to one or more of the features of the aforementioned grouping station, which second grouping station realizes a second subgroup of sheets that is also intended to compose said pack of sheets.

This embodiment of the system is particularly advantageous for the application of the corresponding method in the variant in which two subgroups of sheets applied to the ends of the pack are provided. As will be evident from the drawings, such a plant is able to sequentially assemble all the sheets of the pack according to a manufacturing progression that comprises the positioning of the sheets of a first lower subgroup, to which a known quantity of single sheets (preferably taken from blocks of single non-solidarized sheets) is superimposed, to which in turn a second upper subgroup of solidarized sheets is superimposed. The quantities of the sheets constituting the two subgroups and the quantities of the single interposed sheets are such as to achieve the overall consistency of the pack of sheets.

The pack of sheets thus obtained has therefore the advantage of presenting an excellent coplanarity of the sheets assembled in it, thereby compensating for deviations in an essentially axial direction of the ends of the sheets distanced from the welding areas. In fact, the arrangement at the ends of the armature of two subgroups already solidarized and perfectly coplanar is able to significantly limit the transversal deformations that instead occur in the known assembling and welding systems where, as described above, the execution of weld beads on the outer surface of the armature causes unwanted deformations of the assembly and therefore a lack of coplanarity between the faces at the axial ends of the finished product.

According to a further variant, the selection, separation and pick-up substation is equipped with pick-up means of the mechanic and/or magnetic type and/or operating by suction cup effect, said means of the mechanic type being used for picking up the single sheets and said means of the magnetic type or operating by suction cup effect being used for picking up the subgroups of solidarized sheets or vice versa. Therefore, this variant involves different types of lifting means and these types can be used depending on the object to be picked up. In particular, since one of the main features of the invention is the definition of subgroups of sheets in order to constitute the armature by stacking together with single sheets, it was found to be advantageous to use different mechanical means for lifting the single sheet or for lifting a subgroup provided with solidarizing substances of the same sheets. Depending on the different physical characteristics (such as weight and thickness of the smallest unit to be handled) it is advantageous to differentiate the means involved in lifting. As will be better specified later, the means of mechanical type can be radial clamping grippers that grasp the element and drag it individually upwards. Magnetic devices are, for example, electromagnets activated by command and synchronized with translating elements that lift the element anchored to them and bring it towards the stack of the assembly station.

Alternatively or in combination with magnetic devices, devices operating by suction effect are foreseen, having one or more suction bodies coming into contact with a flat surface of the sheet or of the pack of sheets, and having one or more driven organs to depressurize the chamber formed between the suction cup and such flat surface, so that the lifting of the suction bodies causes the lifting of the sheet or sheets.

According to a possible embodiment of the plant, the selection and separation station comprises:
  a radial clamping gripper of blocks of sheets of known quantity coming from a stack, which can be switched alternatively in the clamped condition of at least part of the sheets of a pack of sheets and in a condition of non-interference with the sheets;
  translators of said clamping gripper for positioning said gripper relative to the end of said stack of sheets corresponding to a predetermined number of sheets;
  a detaching/scraper nail or finger that can be moved along a path with which said finger or said nail separates the sheet erroneously adhering to a sheet of the block of sheets intended to be the last sheet of said block, being the one or more possible last sheets precariously tightened for a part of their thickness or moderately adhering to the lower sheet of the block of sheets, while they are instead intended to constitute the first sheet of the stack of sheets facing the separated block of sheets, wherein the detaching/scraper nail or finger cooperate with an axial band of the perimeter of the sheets of the block of sheets coinciding with a single point of the perimeter of the sheets, and a separator knife being provided which is moveable supported in a radial direction with respect to the axis of the block or stack of sheets and in a position coincident or adjacent to said axial band of the perimeter of the sheets, and which knife is supported further angularly displaceable around the axis of the block or stack of sheets on a path along at least part of the outer perimeter of said sheets, a control unit being provided which activates said translators, said gripper, said scraper finger or nail and said separator knife and which carries out a control program which comprises instructions for performing the functions provided by the method according to one or more of the preceding claims.

According to a possible embodiment of the plant, the sheets have a plan shape which can be inscribed in a circle, while the knife is supported angularly displaceable on a path corresponding to an arc of a circle coaxial to the axis of said circle.

According to a possible embodiment of the plant, the selection and separation station is provided at the upper end of the stack of sheets, at a predetermined distance therefrom.

According to a possible embodiment of the plant, the translating means of the stack of sheets consist of the bottom wall of the vertical magazine for the stack of sheets, which bottom side is slidingly mounted on vertical guides and is sliding driven in the vertical direction and in both directions by a translating actuator.

According to a possible embodiment of the plant, the selection and separation station has an upper support from which depart radially outwards the support arms for the radial clamping gripper of the block of sheets, for the detaching or scraper finger or nail and for the separator knife respectively.

According to a possible embodiment of the plant, the support arm of the separator knife is provided to be angularly rotatable about an axis coinciding with the central axis of the stack or of the block of sheets or parallel to an axis of the stack or of the block of sheets, while on said arm is mounted a carriage sliding along a sliding guide oriented in the longitudinal direction of said arm, and a translation actuator for said carriage along said guide between two extreme positions, one of which is radially external and in which the free tip of the knife is distanced from the mantle surface of the block of sheets and the other is radially internal, in which the separator knife protrudes for a predetermined length in a interposed position between two adjacent sheets of the block of sheets.

According to a possible embodiment of the invention, the plant is intended to be used in combination with ring-shaped sheets and wherein the clamping gripper of the block of sheets comprises a jaw radially external to the mantle wall of said block of sheets and an opposite jaw radially internal with respect to the radially internal mantle surface of said block of sheets, said two jaws have a contact surface with the corresponding inner and outer mantle surface having a predetermined angular length partially extended with respect to the angular extent of the mantle surface and having a corresponding shape, while said two jaws are radially movable in an approached position in which they clamp the block of sheets to each other and in a position of distancing from each other and from the corresponding inner and outer mantle wall.

According to a possible embodiment of the plant, there are further provided removable supports of the block of sheets which are activated after the execution of the separating stroke of the separator knife and the radial displacement away from the block of sheets of the latter, said supports being constituted of at least two radial teeth arranged in different angular positions with respect to each other, preferably diametrically opposed to each other, with respect to the axis of the mantle surface of the stack or the pack of sheets and radially displaceable together by translation actuators in an overlapping position to the face of the last lower sheet of the pack of sheets and in a distancing position radially outward with respect to the outer mantle surface of the stack of sheets and/or the pack of sheets.

According to a possible embodiment of the plant, said at least two radial teeth are each mounted on a radial arm and are supported on sliding guides fixed to said arm and oriented in the longitudinal direction of the same and are controlled in the two sliding directions along the corresponding guide by a translation actuator.

According to a possible embodiment of the plant, the gripper for gripping the pack of sheets, the detaching/scraper nail or finger, the separator knife and the at least two removable teeth for supporting the pack of sheets with the relative support arms, the translation guides and the translation and rotation actuators are supported together by a common support frame, which support frame is mounted displaceable by means of sliding guides and sliding actuators between the selection and separation station for the pack of sheets and an assembly station for an armature of an electric machine or the like, consisting of a plurality of sheets the number of which is at least equal to or greater than the number of sheets provided in a pack.

According to a possible embodiment of the invention, the plant is provided in combination with sheets which have a rotational symmetry for a predetermined angle of rotation in order to allow the formation of an armature consisting of at least two packs of sheets, while the assembly composed of the gripper for gripping the pack of sheets, the detaching/scraper nail or finger, the separator knife and the at least two removable support teeth of the pack of sheets with the relative support arms, the translation guides and the translation and rotation actuators, i.e. the common support frame, is further mounted on a motorized rotation support which is configured so as to rotate the assembly, i.e., the frame around an axis of rotation coinciding with the axis of symmetry of the packs of sheets, in order to allow each pack of sheets to be superimposed on the previous pack rotated with respect to said precedent pack around the axis of symmetry by the rotation angle or by an integer multiple of the same.

BRIEF DESCRIPTION OF THE DRAWINGS

These and other characteristics and advantages of the present invention will become apparent from the following description of some embodiments shown in the attached drawings.

DETAILED DESCRIPTION OF EMBODIMENTS OF THE INVENTION

Figures 1A, 1B:
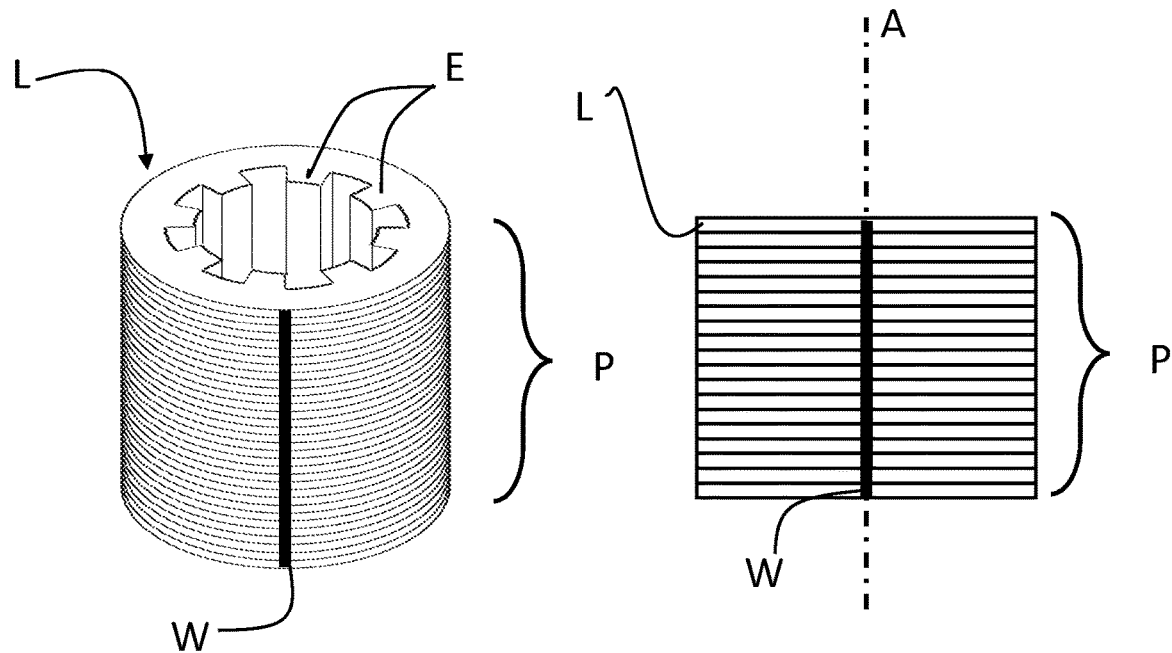
FIGS. 1a and 1b illustrate an assembled pack of sheets constituting a stator of an electric motor shown respectively in a three-dimensional perspective view and in a front view.

With reference to FIG. 1a, it is shown an exemplary perspective representation of a pack P of sheets constituting the armature of an electric motor stator. The pack P of sheets is obtained by superimposing a known number of metal sheets of similar shape, where the single metal sheet is indicated with L and is stacked to form said pack P of sheets.

In the sheet L is defined a plurality of teeth E which will form the polar expansions of the stator. Size, quantity and shape of the teeth are in this case purely indicative and will be chosen according to the design choices suited to the specific performance of the electric motor.

In the representation of the various figures, the single sheet L as well as the stator corresponding to the pack P of sheets has a rotational symmetry, without being limiting to the application of the method or to other embodiments of the plant.

W indicates a generic weld bead executed transversely to the plurality of sheets L and parallel to the assembling axis A (shown in FIG. 1B). As already pointed out, other variants of the method can avoid the use of welding processes in favor for alternative methods of mechanical connection. Advantageously there may be further welding beads not shown in the figure, angularly spaced from the weld bead W.

In the real case, it has been observed how the stacking of a substantial number of sheets L, for example of many tens or hundreds of elements, gives rise to deformations of the sheets in their regions that are farthest from the weld beads. The invention has among its objectives the elimination or at least the reduction of these deformations, which can be found in the form of a lack of coplanarity between the first and last sheet of the pack.

FIG. 1b shows the same pack P of sheets according to a two-dimensional perspective from a plane parallel to the assembling axis A and positioned externally to the pack P of sheets. As in the previous figure it is shown a plurality of sheets L overlapping and aligned along the assembling axis A.

FIG. 2 shows a similar pack P of sheets in the state of semi-finished product, which pack P, according to a variant of the method object of the invention, is composed of two subgroups of sheets SG1 and SG2 which are arranged at the ends of the pack P of sheets, which pack P of sheets being finished by a known number of non-solidarized sheets to form the block of sheets C which is interposed between the two subgroups of integral sheets SG1 and SG2.

Figures 2A, 2B:
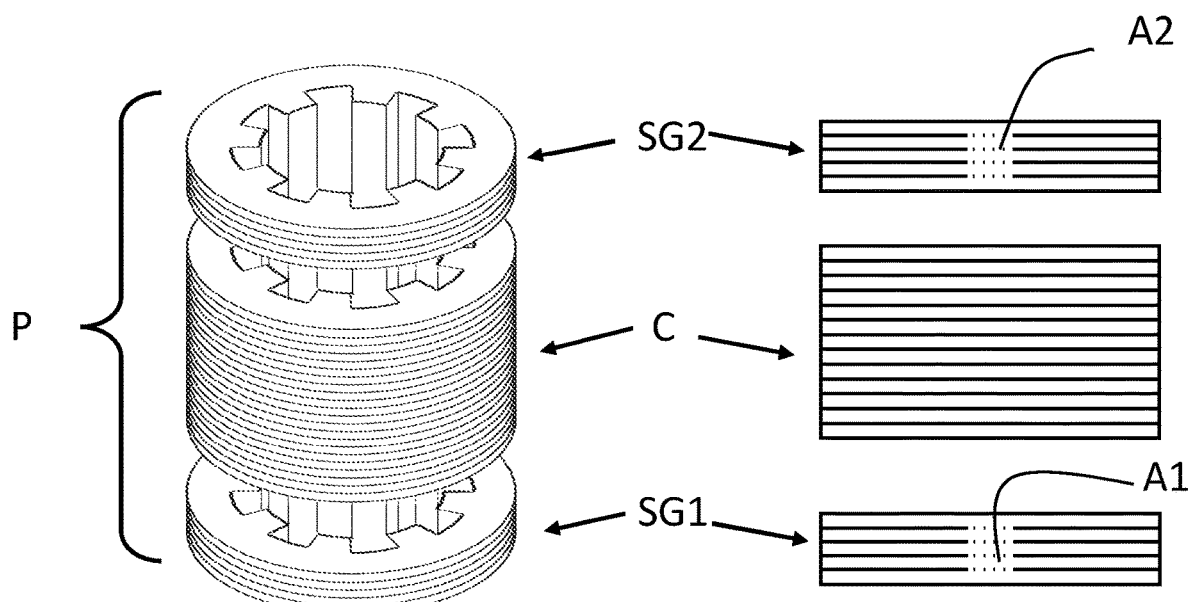
FIGS. 2a and 2b illustrate a pack of sheets similar to the previous one but with separate subgroups, emphasizing a possible arrangement of an adhesion substance.

As figuratively visible in FIG. 2b, the subgroup of sheets SG1 is obtained by applying a solidarizing agent A1 in a similar way to the subgroup SG2 with the solidarizing agent A2. A1 and A2 will be advantageously applied in regions distant from the region of the sheet that is involved by welding W and preferably in proximity to the polar expansions on the inner mantle surface of the stator, which polar expansions are not welded to avoid undesirable effects to the electromagnetic field and the worsening of performance of the electric motor. It is worth repeating that the subgroups of SG1 and SG2 sheets can be treated with adhesion substances and previously solidarized or they can still be waiting for the activation of the solidarizing agents A1 and A2.

Figure 3:
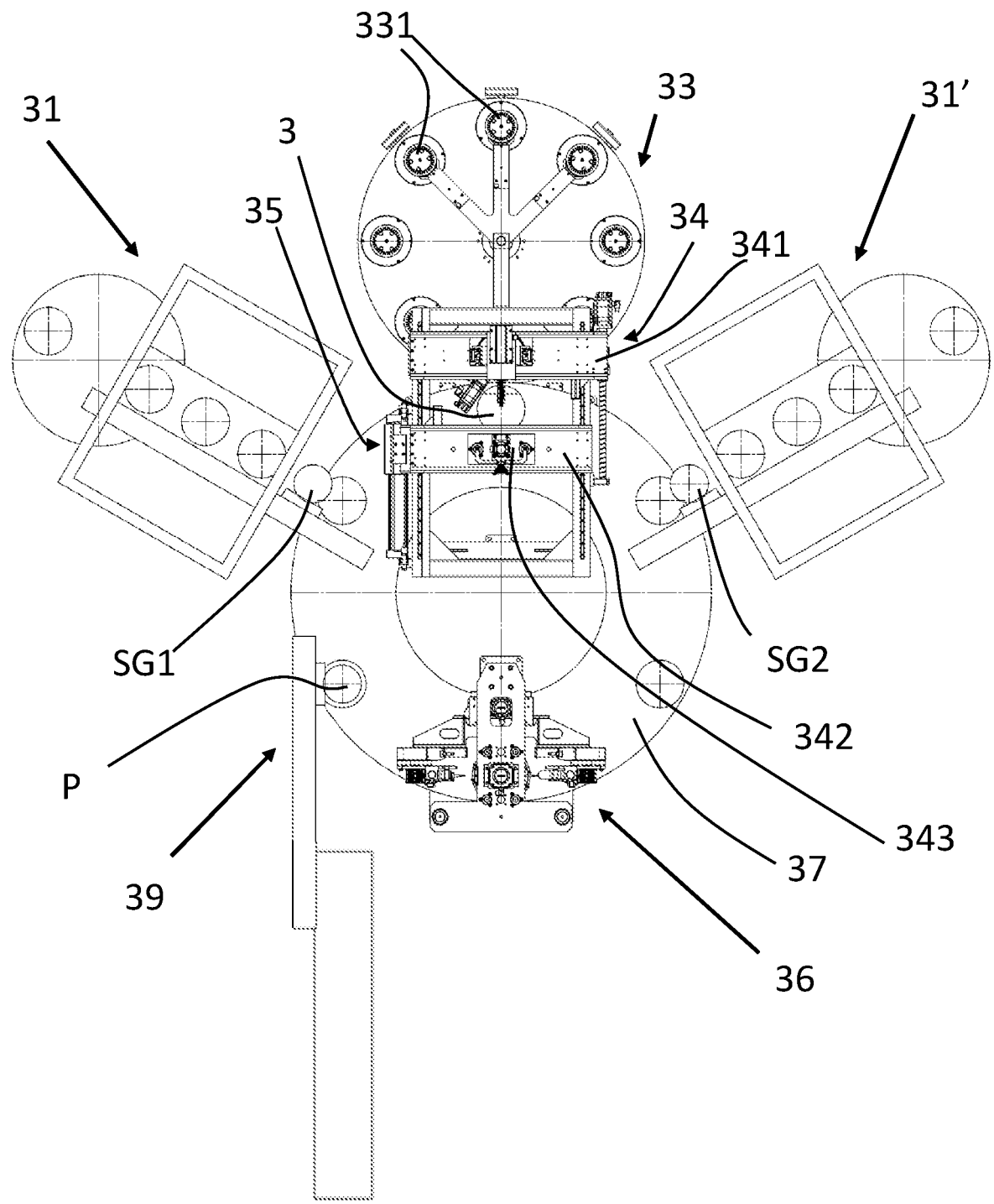
FIG. 3 illustrate an embodiment of a plant for making packs of sheets in accordance with the invention.

FIG. 3 finally shows a plan view of a possible embodiment of a plant for automated manufacturing of packs P of sheets by stacking and welding a predefined number of individual metal sheets L, comprising a first grouping station 31 for forming subgroups of sheets SG1, a selection and separation station 34 for selecting from a vertical magazine 33 a plurality of sheets L to form the central block C of the pack P of sheets, a second grouping station 31' for forming subgroups of sheets SG2, a station for the mechanical joining by soldering 36 and an unloading station 39 of the complete assembly.

The pack P of sheets is assembled in an assembly magazine 3 on which the sheets L that will form the pack P of sheets are stored, and which magazine is provided with guides for centering said sheets and is possibly shaped and/or provided with means for precisely stacking the sheets L so that all the sheets L of the pack P are coaxially arranged.

The assembly magazine 3 is arranged on the peripheral band of a rotating table 37 acting as a conveyor/feeder for a plurality of such assembly magazines 3. As the rotating table 37 rotates, moved by an electric motor with controlled actuation, it transports the assembly magazines from one station to another so as to allow repetition of the assembling process of several pack P of sheets in the intended sequence of macro-steps:
  positioning of the lower subgroup SG1;
  positioning of several sheets L of the central block C;
  pressing of the central block of sheets C;
  positioning of upper subgroup SG2;
  applying welding beads W;
  unloading.

The grouping station 31 includes a substation for selecting, separating, and picking up a predetermined number of sheets from a magazine, a substation for stacking sheets to form the subgroup consisting of the sheets picked up in the previous step, a substation for transferring to the assembly magazine 3 a subgroup of sheets SG1 grouped into the substations of the grouping station 31. For the forming of a subgroup of sheets SG1, at least one substance of mutual adhesion is provided for the solidarization of the subgroup of sheets.

The selection and separation station 34 selects from a vertical magazine 33 a plurality of sheets L to form the central block C of the pack of sheets P by taking them from a plurality of stacks 331 of sheets overlapping each other; in each stack 331 there are several sheets L which are selected in a known and predefined amount by the selection and separation station 34, by separating them from the rest of the stack of sheets 331.

The selection and separation station 34 includes, in a position vertically aligned with the stack 331 of sheets, selectors/separators mounted together on a common frame including a first carriage 341 slidable between said station 34 and a further assembly station 35 aligned along the direction of translation of the carriage 341.

The station 35 is provided in a position aligned with the path of the carriage 341 and includes at least one assembly magazine 3 on which the sheets L forming the pack P of sheets are deposited.

In a position vertically aligned and/or axially coinciding with the assembly magazine 3, i.e. with the packs of sheets deposited on the same, in the station 35 there is provided a presser organ which is also displaceable by means of a carriage 342 in the direction of translation of the carriage 341 which carries the selecting/separating organs.

The carriage 341 carries a slide that controls the lifting from and the sinking against the pack or the packs P of sheets stored in the assembly magazine 3 of said presser member 4.

In combination with station 35, there is provided a conveyor/feeder of a plurality of assembly magazines that are moved between said assembly station 35 and at least one unloading station 39 of the finished armature. The conveyor/feeder of the shown embodiment is formed by a rotating table, designated by 37, which is also horizontal and on the peripheral band of which a plurality of assembling magazines 3 are angularly spaced. A motor with a transmission drives the table 37 in rotation.

In the joining station 36 disposed at an intermediate position between the station 3 and the unloading station 39, there are provided one or more welding tools, not illustrated in detail, which perform a weld line or weld bead in a transverse direction, preferably in a direction parallel to the axis of the pack or packs of sheets in the assembling magazine 3 and in a pressed condition.

Two or more weld lines or two or more weld beads may be provided at different angular positions of the outer mantle surface of the pack or packs of sheets.

The welding tools may be of any type, such as arc-welding tools, plasma-welding tools, laser-welding tools, or other types, and are generally known at the state of the art in this field, as well as any support and displacement mechanisms along the pack or packs of sheets.

The joining station 36 can also be equipped with one or more devices for activating the adhesion substances previously deposited between the sheets of the subgroups SG1 and SG2 but not yet activated regarding their solidarizing action.

In other embodiments, the devices for activating the adhesion substances can alternately be arranged in a station of the same plant foreseen for this purpose or in a second plant in which the pack P is transferred after being unloaded from the plant responsible for assembly.

The second grouping station 31' includes, in a similar manner to the first grouping station 31, a substation for selecting, separating, and picking up a predetermined number of sheets from a magazine, a substation for stacking sheets to form the subgroup SG2 consisting of the sheets picked up in the previous step, a substation for transferring to the assembly magazine 3 a subgroup of sheets SG2 grouped in the substations of the grouping station 31'. For the forming of a subgroup of sheets SG2, least one substance of mutual adhesion is provided for the solidarization of the subgroup of sheets.

Depending on the variants of the method described above, the substations 31 and 31' can operate limitedly to the steps of positioning subgroups of already preformed and pre-solidarized sheets SG1 and SG2, or can include the steps of solidarization (for example by thermal and/or mechanical activation) of the adhesion substances.

From the above description, it is therefore clear that the tool according to the invention fully achieves the intended purposes.

The object of the invention is susceptible to numerous modifications and variations, all of which fall within the protection scope as defined by the claims. All the particularities can be replaced by other technically equivalent elements, and according to the needs, the materials can be different without departing from the scope of the present invention.

Even if the objects have been described with a particular reference to the annexed figures, the reference numerals used in the description and in the claims are used to improve the comprehension of the invention and do not constitute any limitation to the scope of protection claimed.

The invention claimed is:

1. A plant for automated production of a pack of sheets forming a rotor or a stator of a machine by stacking and welding a predefined number of metal sheets, comprising:
    a first adhesive dispenser for disposing an adhesive between sheets of a first subgroup of the sheets;
    a first grouping station for assembling the sheets of the first subgroup of the sheets, the sheets of the first subgroup having the adhesive disposed therebetween;
    a selection and separation station for selecting a plurality of the sheets and forming a central block of the pack;
    a second adhesive dispenser for disposing the adhesive between sheets of a second subgroup of the sheets;
    a second grouping station for assembling the second subgroup of the sheets, the sheets of the second subgroup having the adhesive disposed therebetween;
    an assembly magazine for the first subgroup, the central block, and the second subgroup, the assembly magazine having centering guides;
    a joining station for soldering or welding the sheets of the first subgroup, the central block, and the second group to each other; and
    a control unit configured to control and actuate operation of the first adhesive dispenser, the first grouping station, the selection and separation station, the second adhesive dispenser, the second grouping station, the assembly magazine, and the joining station so as to produce the pack of sheets, in which the first and the second subgroups each have sheets that are adhesively bonded to each other and adjoined with the other sheets of the pack by soldering or welding, and the central block has sheets that are adjoined with the other sheets of the pack only by soldering or welding.

2. The plant according to claim 1, wherein the first subgroup, the central block, and the second subgroup are carried to the joining station by a rotating table that receives the first subgroup from the first grouping station, the central block from the selection and separation station, and the second subgroup from the second grouping station.

3. The plant according to claim 1, wherein the adhesive dispensers deposit the adhesive on an inner portion of the sheets.

4. The plant according to claim 1, wherein the first adhesive dispenser is provided at the first grouping station and the second adhesive dispenser is provided at the second grouping station.

5. The plant according to claim 1, wherein the first grouping station and the second grouping station each comprise one or more substations configured to select, separate, and pick up a predetermined number of sheets from a magazine, and to stack the predetermined number of sheets.

6. The plant according to claim 5, wherein the selection and separation substations each comprises a mechanical pick-up system, a magnetic pick-up system, and/or a suction cup system of the sheets forming the plurality of sheets.

7. The plant according to claim 1, wherein the selection and separation station comprises a selector/separator that selects and separates a plurality of sheets from a vertical magazine and that is mounted on a carriage, a presser also mounted on the carriage, and slide that causes un upward and downward movement of the presser against the plurality of sheets.

8. The plant according to claim 1, wherein the selection and separation station comprises:
    a radial clamping gripper for blocks of the sheets of known quantity coming from a stack, the radial clamping gripper being configured to be switched alternatively in a clamping condition of at least part of the sheets of a stack of the sheets and in a condition of non-interference with the sheets;
    a translator of the radial clamping gripper that positions the radial clamping gripper relative to an end of the stack of the sheets corresponding to a predetermined number of sheets; and
    a detaching or scraper nail or finger configured to be moved along a path, with which the detaching or scraper nail or finger separates the sheets of the stack that are undesirably adhering to a sheet of the block of sheets that is intended to be a last sheet of the block, so as to separate one or more sheets that are engaged to the block but are instead intended to constitute one or more first sheets of a subsequent stack of the sheets facing the block of sheets,
    wherein the detaching or scraper nail or finger cooperates with an axial band of a perimeter of the sheets of the block of sheets coinciding with a single point of the perimeter of the sheets,
    further comprising a separator knife that is moveably supported in a radial direction with respect to an axis of the block of the sheets and in a position coincident or adjacent to the axial band of the perimeter of the sheets, the separator knife being further supported to be angularly displaceable around the axis of the block of the sheets on a path along at least part of the perimeter of the sheets,
    wherein the control unit activates the translator, the radial clamping gripper, the detaching or scraper nail or finger, and the separator knife.

9. The plant according to claim 8, wherein the sheets have a plan shape which can be inscribed in a circle, and wherein the separator knife is supported to angularly displaceable on a path corresponding to an arc of a circle coaxial to an axis of the circle.

10. A method of making a pack of sheets forming a rotor or a stator of a machine by stacking and stably connecting a predetermined number of sheets along at least two weld beads disposed in opposing or different angular positions, the sheets being metallic sheets, the method comprising:

providing a plant according to claim 1;

forming the first subgroup of the sheets, the central block of the pack, and the second subgroup of the sheets;

providing the adhesive, at least one region of reciprocal contact of surfaces of the sheet in the first and the second subgroups, the adhesive being adapted to be activated by chemical-physical action; and solidarizing the first and the second subgroups of the sheets;

wherein the adhesive is applied, simultaneously with the forming of the first and the second subgroups, or is applied previously to the sheets of the first and the second subgroups.

11. The method according to claim 10, wherein the first and the second subgroups of the sheets are arranged at opposite ends of the pack of sheets.

12. The method according to claim 10, wherein the first subgroup, the central block, and the second subgroup are selected, assembled and solidarized separately, further comprising the steps of picking up, assembling and solidarizing a predetermined quantity of the sheets in amounts that constitutes the first subgroup, the central block, and the second subgroup, and of stacking the first subgroup, the central block, and the second subgroup to form the pack of sheets.

13. The method according to claim 12, wherein the step of stacking comprises an orderly stacking, according to the following sequence, of:

the first subgroup of the sheets provided with the adhesive;

the central block that includes an additional plurality of the sheets;

the second subgroup of the sheets provided with the adhesive.

14. The method according to claim 13, wherein a number of the sheets constituting the second subgroup is calculated according to the following steps:

defining a target quantity of the sheets of a predetermined thickness;

defining a target axial thickness of the pack of sheets;

stacking a plurality of the sheets in a number less than the target quantity of the sheets;

determining a cumulative axial thickness of the pack of sheets after stacking the target quantity of the sheets;

determining an amount of axial thickness that is missing from the target axial thickness by subtracting, from the target axial thickness, the cumulative axial thickness;

calculating the number of the sheets constituting the second subgroup as a function of the missing amount of axial thickness and of a thickness of an individual sheet;

producing the second subgroup by applying the adhesive to a number of the individual sheets equal to the number defined in the step of calculating; and stacking the second subgroup with the first subgroup and the central block.

15. The method according to claim 14, wherein the step for determining the axial thickness that is missing is repeated in one or more predetermined moments of the method.

16. The method according to claim 13, further comprising an in-line process comprising:

assembling the pack of sheets sequential to the step of stacking, or assembling the pack of sheets previously and separately from forming the pack of sheets.

17. The method according to claim 10, wherein the adhesive pre-activated or is adapted to be activated when subjected to predetermined environmental conditions.

18. The method according to claim 10, wherein at least part of the sheets constituting the at first and the second subgroups is pretreated with the adhesive.

19. The method according to claim 10, wherein the adhesive is one or more of:

a cyanoacrylate adhesive; an epoxy adhesive; a hot melt adhesive; a semi-solid anaerobic adhesive; or a two or more component adhesive.

\* \* \* \* \*